(12) United States Patent
Wang

(10) Patent No.: US 10,304,173 B2
(45) Date of Patent: May 28, 2019

(54) GLOBAL ADJUSTMENT OF LUMINANCE AND CHROMINANCE CONSISTENCY AMONG MULTIPLE IMAGES

(71) Applicant: SHANGHAI XIAOYI TECHNOLOGY CO., LTD., Shanghai (CN)

(72) Inventor: Kongqiao Wang, Shanghai (CN)

(73) Assignee: Shanghai Xiaoyi Technology Co., Ltd., Shanghai (CN)

( * ) Notice: Subject to any disclaimer, the term of this patent is extended or adjusted under 35 U.S.C. 154(b) by 69 days.

(21) Appl. No.: 15/198,171

(22) Filed: Jun. 30, 2016

(65) Prior Publication Data
US 2017/0352138 A1 Dec. 7, 2017

(30) Foreign Application Priority Data
Jun. 3, 2016 (CN) .......................... 2016 1 0392155

(51) Int. Cl.
G06T 5/00 (2006.01)
G06T 5/50 (2006.01)
G06T 3/00 (2006.01)
G06T 3/40 (2006.01)
(Continued)

(52) U.S. Cl.
CPC .............. *G06T 5/50* (2013.01); *G06T 3/0062* (2013.01); *G06T 3/4038* (2013.01); *G06T 5/009* (2013.01);
(Continued)

(58) Field of Classification Search
None
See application file for complete search history.

(56) References Cited

U.S. PATENT DOCUMENTS

2011/0141224 A1* 6/2011 Stec .......................... G06T 1/00
348/36
2011/0141225 A1* 6/2011 Stec .......................... G06T 1/00
348/36
(Continued)

FOREIGN PATENT DOCUMENTS

CN 104125410 A 10/2014
CN 105516614 A 4/2016

OTHER PUBLICATIONS

Efficient Video Panoramic Image Stitching Based on an Improved Selection of Harris Corners and a Multiple-Constraint Corner Matching. Minchen Zhu, Weizhi Wang, Binghan Liu, Jingshan Huang. Dec. 2013.*

*Primary Examiner* — Delomia L Gilliard
(74) *Attorney, Agent, or Firm* — Finnegan, Henderson, Farabow, Garrett & Dunner, LLP

(57) ABSTRACT

The present disclosure relates to methods and apparatus for globally adjusting luminance and/or chrominance consistency among multiple images. The methods may include sorting a plurality of images in an order, such that: adjacent images at least partially overlap with each other; and the first image and the last image at least partially overlap with each other. The methods may also include determining mean pixel values for overlapping region of the images. The methods may also include determining consistency factors for the images. The methods may also include generating modified mean pixel values by multiplying the mean pixel values by the respective consistency factors. The methods may also include adjusting the consistency factors to reduce differences of the modified mean pixel values in the overlapping regions. The methods may further include adjusting pixel values of the images based on the respective consistency factors.

20 Claims, 6 Drawing Sheets

(51) Int. Cl.
*G06T 11/60* (2006.01)
*H04N 1/60* (2006.01)
*H04N 1/387* (2006.01)
*G06T 7/00* (2017.01)

(52) U.S. Cl.
CPC ............... *G06T 7/97* (2017.01); *G06T 11/60* (2013.01); *H04N 1/3876* (2013.01); *H04N 1/6027* (2013.01); *G06T 2207/10024* (2013.01); *G06T 2207/20221* (2013.01)

(56) References Cited

U.S. PATENT DOCUMENTS

| | | | |
|---|---|---|---|
| 2011/0141226 A1* | 6/2011 | Stec | G06T 3/4038 348/36 |
| 2011/0141227 A1* | 6/2011 | Bigioi | H04N 13/106 348/36 |
| 2011/0141229 A1* | 6/2011 | Stec | H04N 5/232 348/37 |
| 2011/0141300 A1* | 6/2011 | Stec | G06T 3/4038 348/222.1 |
| 2012/0019613 A1* | 1/2012 | Murray | H04N 13/106 348/36 |
| 2012/0019614 A1* | 1/2012 | Murray | H04N 13/106 348/36 |
| 2015/0071534 A1* | 3/2015 | Riley | B60R 1/002 382/167 |
| 2016/0088287 A1* | 3/2016 | Sadi | H04N 19/54 348/43 |
| 2017/0230585 A1* | 8/2017 | Nash | H04N 5/23296 |
| 2017/0345214 A1* | 11/2017 | Hung | G06T 19/006 |

\* cited by examiner

GLOBAL ADJUSTMENT OF LUMINANCE AND CHROMINANCE CONSISTENCY AMONG MULTIPLE IMAGES

CROSS-REFERENCE TO RELATED APPLICATION

This application is based upon and claims priority from Chinese Patent Application No. 201610392155.3, filed on Jun. 3, 2016, the disclosure of which is expressly incorporated herein by reference in its entirety.

TECHNICAL FIELD

The present disclosure generally relates to image processing technology, and more specifically to methods and systems for globally adjusting luminance and/or chrominance consistency among multiple images.

BACKGROUND

Image stitching has been gaining prominence in many application areas including, for example, computer vision, digital maps, satellite imaging, medical imaging, and even amateur photography. For example, to create an immersive virtual-reality experience, multiple cameras may be used to capture source images covering different parts of a scene. These source images are then "stitched," that is, joined together, to form a 360-degree panorama that can be used in applications such as interactive panoramic movies, architectural walk-through, multi-node movies, and other applications associated with generating a virtual 3D environment using images acquired from the real world.

Because the source images used for panorama stitching may be generated by different imaging devices, at different times, and/or under different illumination conditions, a well-known challenge for panorama stitching is inconsistency in image parameters of the source images. To solve this issue, the conventional method adjusts the contrasts of two adjacent source images, pair by pair, to ensure that the luminance and/or color histograms in the overlapping regions are matched. This method usually achieves local consistency but not global consistency, due to accumulated error. For example, when more than two source images are stitched using this method, the last stitched source image and the first source image may still have significantly inconsistent luminance/chrominance. Such result may be acceptable in some applications. e.g., mobile-phone applications, where the generated panoramic image often has a larger than normal viewing angle, but less than 360 degrees. However, to generate high-quality panorama and/or 360-degree panorama (i.e., the views shown by the first and last source images actually overlap), it is desirable for the first and last source images to have consistent luminance and chrominance. Therefore, a global luminance/chrominance adjustment method is needed.

The disclosed methods and systems address one or more of the problems listed above.

SUMMARY

Consistent with one embodiment of the present disclosure, there is provided a method for stitching a plurality of images including pixels having pixel values. The method may include sorting the plurality of images in an order, such that: adjacent images at least partially overlap with each other; and the first image and the last image at least partially overlap with each other. The method may also include determining mean pixel values for overlapping region of the images. The method may also include determining consistency factors for the images. The method may also include generating modified mean pixel values by multiplying the mean pixel values by the respective consistency factors. The method may also include adjusting the consistency factors to reduce differences of the modified mean pixel values in the overlapping regions. The method may further include adjusting the pixel values of the images based on the respective consistency factors.

Consistent with another embodiment of the present disclosure, there is provided a method for combining multiple images. The method may include obtaining n images, n being an integer and n≥2. The method may also include identifying first and second regions in the images. The method may also include sorting the images in an order. The method may also include among the n images, pairing the second region of the ith image with the first region of the (i+1)th image, i being an integer and n>i≥1. The method may also include pairing the second region of the nth image with the first region of the first image. The method may also include determining mean pixel values in the first and second regions. The method may also include determining consistency factors for the images. The method may also include generating modified mean pixel values by multiplying the mean pixel values by the respective consistency factors. The method may also include adjusting the consistency factors to reduce differences of the modified mean pixel values in the paired regions. The method may further include adjusting the pixel values of the images based on the respective consistency factors.

Consistent with another embodiment of the present disclosure, there is provided a device for stitching a plurality of images including pixels having pixel values. The device may include a memory storing instructions. The device may also include a processor configured to execute the instructions to: sort the plurality of images in an order, such that adjacent images at least partially overlap with each other and the first image and the last image at least partially overlap with each other; determine mean pixel values for overlapping region of the images; determine consistency factors for the images; generate modified mean pixel values by multiplying the mean pixel values by the respective consistency factors; adjust the consistency factors to reduce differences of the modified mean pixel values in the overlapping regions; and adjust the pixel values of the images based on the respective consistency factors.

Consistent with yet another embodiment of the present disclosure, there is provided a non-transitory computer-readable storage medium storing instructions that, when executed by a processor of a device, cause the device to perform a method for stitching a plurality of images including pixels having pixel values. The method may include sorting the plurality of images in an order, such that: adjacent images at least partially overlap with each other; and the first image and the last image at least partially overlap with each other. The method may also include determining mean pixel values for overlapping region of the images. The method may also include determining consistency factors for the images. The method may also include generating modified mean pixel values by multiplying the mean pixel values by the respective consistency factors. The method may also include adjusting the consistency factors to reduce differences of the modified mean pixel values in the overlapping regions. The method may further include adjusting the pixel values of the images based on the respective consistency factors.

It is to be understood that both the foregoing general description and the following detailed description are exemplary and explanatory only and are not restrictive of the invention, as claimed.

DESCRIPTION OF DRAWINGS

Methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Features and characteristics of the present disclosure, as well as methods of operation and functions of related elements of structure and the combination of parts and economies of manufacture, may become more apparent upon consideration of the following description with reference to the accompanying drawings, all of which form a part of this specification. It is to be understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
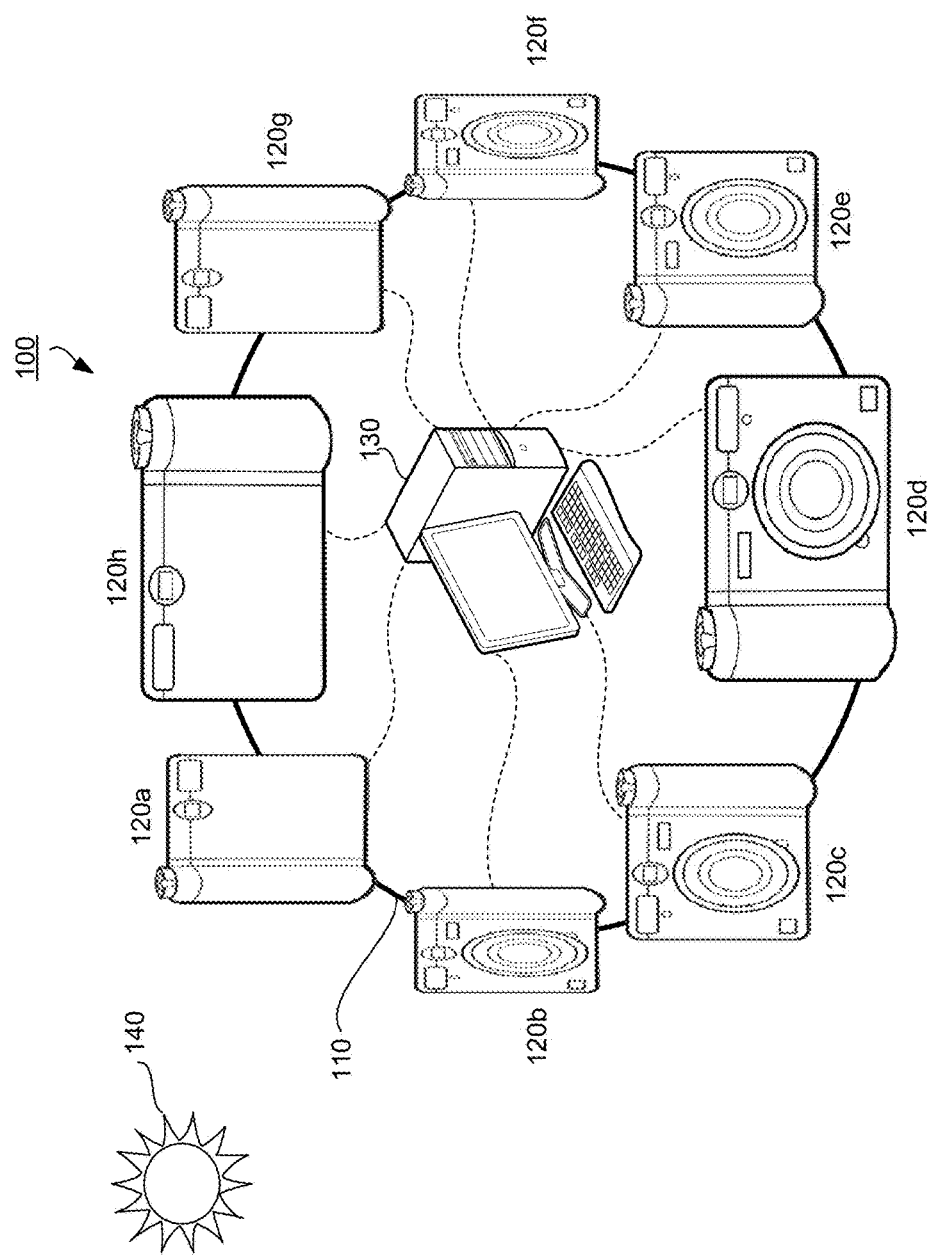
FIG. 1 is a schematic diagram illustrating an imaging system for creating panoramic images, according to an exemplary embodiment.

FIG. 1 is a schematic diagram illustrating an imaging system 100 for creating panoramic images, according to an exemplary embodiment. Referring to FIG. 1, system 100 may include a camera rig 110, one or more cameras 120 (e.g., cameras 120a, 120b, 120c, . . . , and 120h illustrated in FIG. 1), and a controller 130. Unless otherwise noted, the term "camera 120" should be understood to mean any or all of cameras 120a-120h.

Camera rig 110 may be a structure used for mounting cameras 120. Camera rig 110 may be built to form a specially designed camera path. Industry standard trussing and grip gear can be used in conjunction with various custom rigging solutions to allow substantial flexibility with positioning, height, and camera movement. Camera rig 110 may include complex structures that include multiple circles and curves with various diameters, straight tracks, incline/decline angles, overhead rigging, etc. Camera rig 110 may also be as simple as a single straight or curved track. For example, in 360-degree panorama photography, camera rig 110 may form a 360-degree circle for aligning cameras 120.

Camera 120 may be an image capturing device that includes any of optical devices, lenses, charge coupled devices (CCD), complementary metal-oxide-semiconductor (CMOS) detector arrays and driving circuitry, and other arrangements of optical components, electronic components, and control circuitry used in transmitting and receiving light of various wavelengths. For example, camera 120 may be an action camera, a digital camera, a web camera, or digital single-lens reflex (DSLR) camera. Camera 120 may also be imbedded in another device, such as a smartphone, a computer, a personal digital assistant (PDA), a monitoring device, a video gaming console, etc.

Camera 120 may be configured to capture one or more images in a variety of ways. For example, camera 120 may be configured to capture images initiated by a user, by programming, by a hardware setting, or by a combination thereof. In some embodiments, when camera 120 is configured to capture images by software or hardware programming or by a hardware setting, image capture can be performed at one or more predetermined conditions. For example, multiple cameras 120 may be controlled by controller 130 to capture images simultaneously or in an ordered fashion. Alternatively, or additionally, a set of predetermined conditions, for example, the sensing of a moving object, can trigger camera 120 to capture images. In some embodiments, capturing images may include placing camera 120 in a mode or setting capable of capturing one or more images. As used herein, an "image" can refer to, in part or in whole, a static or dynamic visual representation including, but not limited to, a photo, a picture, a graphic, a video, a hologram, a virtual reality image, an augmented reality image, other visual representations, or combinations thereof.

Camera 120 may include various features suitable for panorama creation. In one embodiment, camera 120 may use a 16 MP (megapixel) light sensor capable of capturing high-resolution (e.g., 4608×3456) photos with enhanced color and contrast. Camera 120 may also have a wide field of view, such as a 155-degree viewing angle. Camera 12 may further be configured to record videos with various resolutions and frame rates, such as 1296p at 30 fps, and 1080p at 30 fps or 60 fps.

As shown in FIG. 1, in one embodiment, eight cameras 120, i.e., cameras 120a-120h, may be evenly separated and mounted on camera rig 110 to form a circle. The eight cameras 120 may collaborate to achieve full 360-degree panorama coverage. For example, source images taken by some or all of cameras 120 at the same time or at different points in time may be stitched together to generate a 360-degree panoramic image.

Although FIG. 1 shows system 100 include eight cameras 120, it is contemplated that a panoramic image may also be created using more or fewer cameras, or even a single camera 120. For example, a single camera 120 may change its positions and/or orientations to capture multiple source images at different points in time. These source images may then be stitched together to form a panoramic image.

However, no matter whether the source images to be stitched are captured by different cameras at the same time or by the same camera at different points in time, different source images may have different luminance and/or chrominance due to the diverse conditions under which each source image is taken. For example, since image capture parameters are automatically set in camera 120 for each source image depending on the real-time imaging condition, changes in illumination levels may lead to different exposure levels in adjacent source images to be stitched, and different distributions of variously colored objects may affect white-balance settings, yielding images where the same objects seen in different source images appear different, being either brighter or darker, or even having different apparent colors.

For example, as shown in FIG. 1, cameras 120a-120h may be used to simultaneously capture source images $M_a$-$M_h$ (not shown) respectively, under a light source 140 (e.g., a flash unit or the sun). Source images $M_a$-$M_h$ may then be sequentially stitched to create a 360-degree panoramic image, with $M_a$ being the first source image and $M_h$ being the last source image. Cameras 120a and 120b may be working in backlit conditions causing source images $M_a$ and $M_b$ to show an object as darker, while cameras 120e and 120f are working in reflected light conditions and causing source images $M_e$ and $M_f$ to show the same object as brighter. Accordingly, in the resulted panorama, although source images ($M_a$, $M_b$) are not immediately adjacent to source images $M_e$, $M_f$, the luminance and/or chrominance inconsistency between ($M_a$, $M_b$) and ($M_e$, $M_f$) may be significant enough to draw a viewer's attention. Moreover, in a 360-degree panorama, the first source image $M_a$ and the last source image $M_h$ also need to be stitched together, and therefore any luminance and/or chrominance inconsistency between $M_a$ and $M_h$ may also be easily noticed.

To address the above-identified problems, the present disclosure provides global adjusting methods for achieving luminance and/or chrominance consistency across some or all of the source images that form a panorama. That is, the disclosed methods not only ensure local luminance and/or chrominance consistency between two adjacent source images, but also ensure global luminance and/or chrominance consistency among non-adjacent source images, and in particular, between the first and last source images in the stitching sequence.

In exemplary embodiments, cameras 120 may send the captured source images to controller 130 for further processing, including creating a panoramic image using the disclosed methods. Controller 130 may be an independent device specially designed for panorama creation. Alternatively, controller 130 may be part of a larger device, such as a computer. Moreover, controller 130 may be implemented through hardware, software, or a combination of hardware and software. Controller 130 may be connected to cameras 120 in a wired and/or wireless manner, such as through communication cables and/or a WiFi network. Controller 130 may send control signals to cameras 120 to control the camera operation, including capturing the source images. Controller 130 may also receive the captured source images and/or video frames from cameras 120 and stitch these source images into panoramic images.

Figure 2:
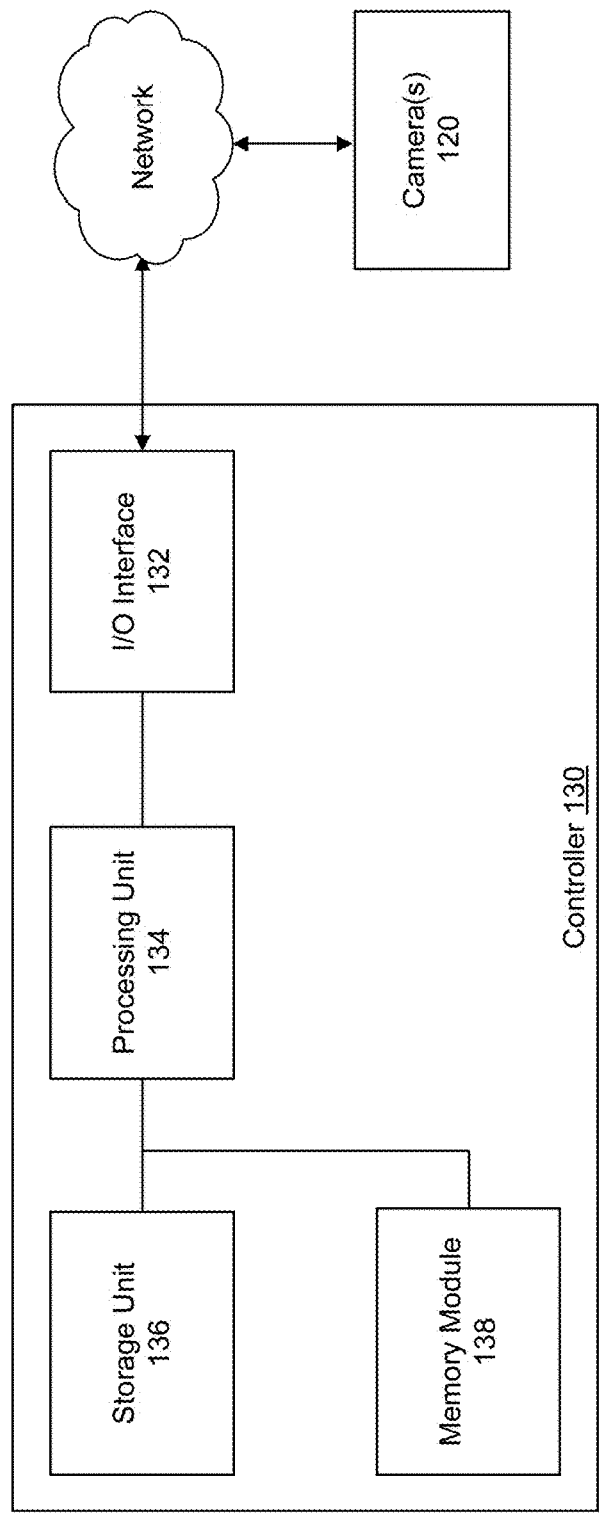
FIG. 2 is a block diagram of a controller used in the imaging system shown in FIG. 1, according to an exemplary embodiment.

FIG. 2 is a block diagram of a controller 130, according to an exemplary embodiment. For example, controller 130 may be used in imaging system 100. Referring to FIG. 2, controller 130 may include an input/output (I/O) interface 132, a processing unit 134, a storage unit 136, and/or a memory module 138.

I/O interface 132 may be configured for two-way communication between controller 130 and various devices. For example, as depicted in FIG. 2, I/O interface 132 may send and receive operating signals to cameras 120, and receive the captured images and/or video frames from cameras 120. I/O interface 132 may send and receive the data via communication cables, networks, or other communication mediums. The network may be any type of wired or wireless network that may allow transmitting and receiving data. For example, the network may be a nationwide cellular network, a local wireless network (e.g., Bluetooth™ or WiFi), or a wired network.

I/O interface 132 may be configured to consolidate image data it receives from the cameras 120 and relay the consolidated image data to processing unit 134. Processing unit 134 may include any appropriate type of general purpose or special-purpose microprocessor, digital signal processor, or microprocessor. Processing unit 134 may be configured as a separate processor module dedicated to create panoramic images. Alternatively, processing unit 134 may be configured as a shared processor module for performing other functions unrelated to panorama creation. Processing unit 134 may execute computer instructions (program code) and perform functions in accordance with techniques described herein. Computer instructions include routines, programs, objects, components, data structures, procedures, modules, and functions.

Each of storage unit 136 and/or memory module 138 includes one or more memories configured to store the instructions and/or data used for creating panoramic images. The memories may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

Storage unit 136 and/or memory module 138 may be configured to store the computer instructions and data that may be used by processing unit 134 to perform functions consistent with the present disclosure. For example, storage unit 136 and/or memory module 138 may store the source images to be stitched and the created panoramic images. As another example, storage unit 136 and/or memory module 138 may store computer instructions for performing the disclosed methods for globally adjusting the luminance and/or chrominance during panorama creation.

Figure 3:
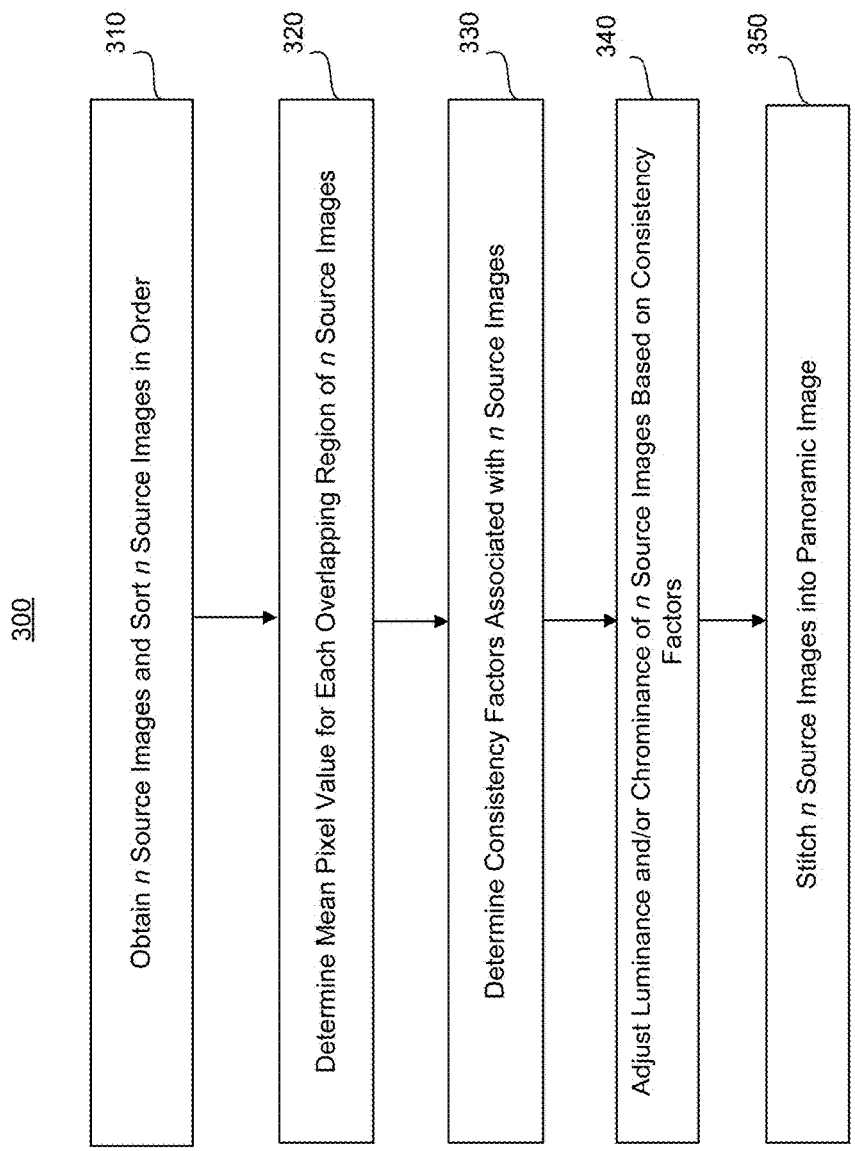
FIG. 3 is a flowchart of a method for stitching a plurality of images, according to an exemplary embodiment.

FIG. 3 is a flowchart of a method 300 for stitching a plurality of images, according to an exemplary embodiment. For example, method 300 may be performed in controller 130. Referring to FIG. 3, method 300 may include the following steps.

In step 310, controller 130 obtains n source images and sorts the n source images in an order. Here n is an integer and n≥2.

Each of the ordered source images may partially overlap with its neighboring source images. For example, in the cases of n≥3, when i is an integer and n>i≥2, the ith source image may have a first region overlapping with at least part of the (i−1)th source image, and a second region overlapping with at least part of the (i+1)th source image. In addition, in 360-degree panorama creation, the nth source image may also overlap with the first source image. As described below in more detail, controller 130 may stitch the n source images by merging them at the overlapping regions.

In the above-described example with respect to FIG. 1, controller 130 may obtain eight source images $M_a$-$M_h$ and order them in the sequence of $M_a$, $M_b$, . . . , and $M_h$. Each source image may include two regions overlapping with the two adjacent source images, respectively. Since $M_a$-$M_h$ jointly cover a 360-degree view and the first image $M_a$ and the last $M_h$ image partially overlap with each other, $M_a$ and $M_h$ are also considered as "adjacent" source images.

In step 320, controller 130 determines a mean pixel value for overlapping regions of the n source images. As used by the present disclosure, the term "pixel value" refers to a luminance value and/or chrominance value associated with a pixel in the source images or the created panoramic images. The luminance value and chrominance value may be obtained from any color space, such as RGB or YUV color spaces. Accordingly, the disclosed methods are applicable to both RGB and YUV color spaces. Without loss of generality, the following description will assume the pixel values are luminance values (hereinafter denoted as "Y").

In step 320, controller 130 may determine the mean luminance value $\overline{Y}$ of each overlapping region. For example, the ith source image partially overlaps with the (i+1)th source image. Accordingly, controller 131 may determine the mean luminance values, $\overline{Y}$ and $\overline{Y'}$, for the pair of overlapping regions in the ith and (i+1)th source images, respectively. Since the ith and (i+1)th source images may have inconsistent luminance, $\overline{Y}$ and $\overline{Y'}$ may be different.

In step 330, controller 130 determines consistency factors (discussed below) associated with the n source images. The consistency factors are used for adjusting the pixel values of the respective source images, so as to obtain the global luminance and/or chrominance consistence among the n source images.

Figure 4:
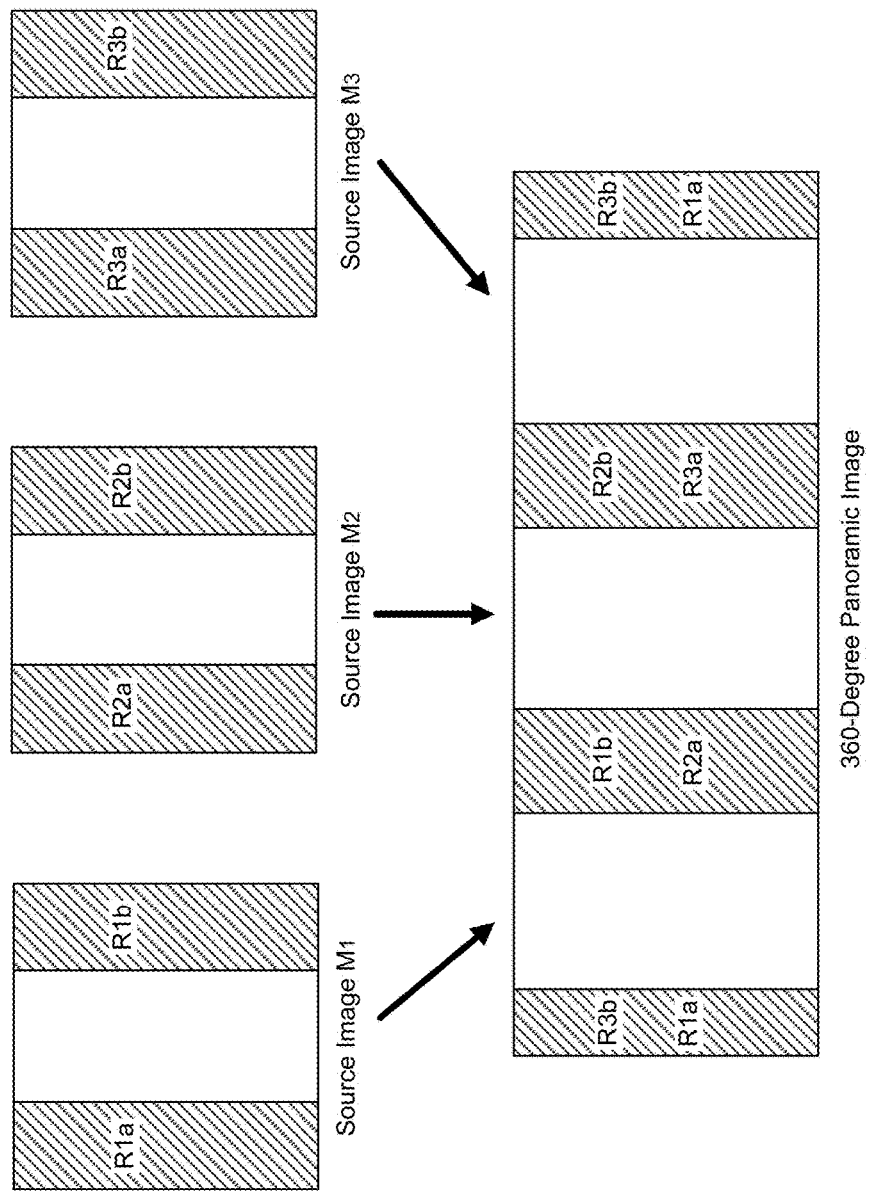
FIG. 4 is a schematic diagram illustrating an implementation of the method shown in FIG. 3, according to an exemplary embodiment.

FIG. 4 is a schematic diagram illustrating an implementation of the method 300, according to an exemplary embodiment. Referring to FIG. 4, three source images, $M_1$, $M_2$, and $M_3$, may be stitched to create a 360-degree panoramic image. Each source image may include two regions that overlap with the two adjacent source images respectively. Namely, region $R_{1b}$ overlaps with region $R_{2a}$, region $R_{2b}$ overlaps with region $R_{3a}$, and region $R_{3b}$ overlaps with region $R_{1a}$. Each of the six overlapping regions has a mean luminance value, denoted by $\overline{Y}_{1a}$, $\overline{Y}_{1b}$, $\overline{Y}_{2a}$, $\overline{Y}_{2b}$, $\overline{Y}_{3a}$, and $\overline{Y}_{3b}$, respectively. Controller 130 may determine a consistency factor for each source image, denoted by $f_1$, $f_2$, and $f_3$, respectively.

Ideally, for source images $M_1$, $M_2$, and $M_3$ to have consistent luminance, the mean luminance values and the consistency factors should satisfy the following equations:

$$\begin{cases} f_1 \overline{Y}_{1b} = f_2 \overline{Y}_{2a} \\ f_2 \overline{Y}_{2b} = f_3 \overline{Y}_{3a} \\ f_3 \overline{Y}_{3b} = f_1 \overline{Y}_{1a} \end{cases} \quad \text{Eqs. 1}$$

Eqs. 1 require that:

$$\frac{\overline{Y}_{3b}}{\overline{Y}_{1a}} = \frac{f_1}{f_3} = \frac{f_2 \overline{Y}_{2a}/\overline{Y}_{1b}}{f_2 \overline{Y}_{2b}/\overline{Y}_{3a}} = \frac{\overline{Y}_{2a}}{\overline{Y}_{1b}} \frac{\overline{Y}_{3a}}{\overline{Y}_{2b}} \quad \text{Eq. 2}$$

However, in practice, it is almost impossible for Eq. 2 to be satisfied. This is because the mean luminance values, as obtained from the source images, are random and have no inherent relations to each other.

Consistent with the present disclosure, to address the above-described difficulty, an error function, as applied to 360-degree panorama creation, is defined according to the following equation:

$$E = \sum_{i=1}^{n} (f_i \overline{Y}_{ib} - f_{(i+1)} \overline{Y}_{(i+1)a})^2 \quad \text{Eq. 3}$$

$$= (f_1 \overline{Y}_{1b} - f_2 \overline{Y}_{2a})^2 + (f_2 \overline{Y}_{2b} - f_3 \overline{Y}_{3a})^2 + \ldots +$$

$$(f_n \overline{Y}_{nb} - f_{(n+1)} \overline{Y}_{(n+1)a})^2$$

$$= (f_1 \overline{Y}_{1b} - f_2 \overline{Y}_{2a})^2 + (f_2 \overline{Y}_{2b} - f_3 \overline{Y}_{3a})^2 + \ldots +$$

$$(f_n \overline{Y}_{nb} - f_1 \overline{Y}_{1a})^2$$

As indicated by Eq. 3, since the first source image and the nth source image partially overlap with each other, $$f_{(n+1)} = f_1 \quad \text{Eq. 4}$$

and $$\overline{Y}_{(n+1)a} = \overline{Y}_{1a} \quad \text{Eq. 5}$$

Controller 130 may determine the consistency factors $f_i$ by minimizing the error function, that is:

$$\min E = \min(\Sigma_{i=1}^{n}(f_i \overline{Y}_{ib} - f_{(i+1)} \overline{Y}_{(i+1)a})^2) \quad \text{Eq. 6}$$

In practice, Eq. 6 requires that:

$$\begin{cases} (f_1 \overline{Y}_{1b} - f_2 \overline{Y}_{2a})^2 < \delta_1 \\ \ldots \\ (f_i \overline{Y}_{ib} - f_{(i+1)} \overline{Y}_{(i+1)a})^2 < \delta_i \\ \ldots \\ (f_n \overline{Y}_{nb} - f_1 \overline{Y}_{1a})^2 < \delta_n \end{cases} \quad \text{Eqs. 7}$$

where $$\delta_1 \to 0, \delta_2 \to 0, \ldots, \delta_i \to 0, \ldots, \delta_n \to 0 \quad \text{Eq. 8}$$

Accordingly, controller 130 may run an optimization process to search for a small positive number $\delta$ that satisfies Eqs. 7 and 8. Specifically, controller 130 may adjust the consistency factors $f_i$ until the Eqs. 7 and 8 are satisfied. The finally obtained consistency factors $f_i$ are the desired consistency factors.

In step 340 (FIG. 3), controller 130 adjusts the luminance and/or chrominance of the n source images based on the consistency factors.

Following the above description regarding luminance values, controller 130 may adjust the luminance of each source image by multiplying the luminance value associated with each pixel therein by the corresponding consistency factor $f_i$. For example, referring to FIG. 4, controller 130 may determine the consistency factor $f_2$ for source image $M_1$. Controller 130 may then multiply the luminance values in regions $R_{1a}$ and $R_{2b}$, and in the middle region between $R_{1a}$ and $R_{1b}$, by the consistency factor $f_2$. Controller 130 may perform similar operations on source images $M_2$ and $M_3$. In this manner, controller 130 may globally optimize the luminance consistency among all the source images.

In step 350, controller 130 stitches the n source images into a panoramic image.

Controller 130 may stitch the optimized source images into the panoramic image, according to any suitable method. For example, controller 130 may sequentially stitch the source images in the order determined in step 310. To stitch the ith source image to the existing panoramic image, i.e., the panoramic image including the first (i−1) source images, controller 130 may find an optimal seam in the overlapping regions of the (i−1)th and ith source images, and merge the two source images together along the seam. In order to reduce color differences between these two source images and smooth color transitions in the panoramic image, controller 130 may perform image blending with an error diffusion process. That is, controller 130 may compute color differences on the seam and spread the luminance (and/or color) differences over all pixels in the side of the ith source image. Controller 130 may update luminance (and/or color) values of these pixels by adding the contributions. Controller 130 may then encode and save the updated pixel values of the ith source image into the panoramic image file. In this way, controller 130 can smooth color transitions of the current panoramic image. Controller 130 may repeat this processing for all source images. Moreover, in the case of 360-degree panorama, controller 130 may find an optimal seam in the overlapping regions of the first and the nth source image, and merge these two source images at the optimal seam to create a continuous circular 360-degree panoramic image.

In addition to luminance consistency, it is contemplated that the above-described method 300 may be similarly applied to global optimization of chrominance consistency. In some embodiments, the same consistency factors may be determined and used for both luminance and chrominance. In other embodiments, different sets of consistency factors may be determined and used for luminance and chrominance separately.

Figure 5:
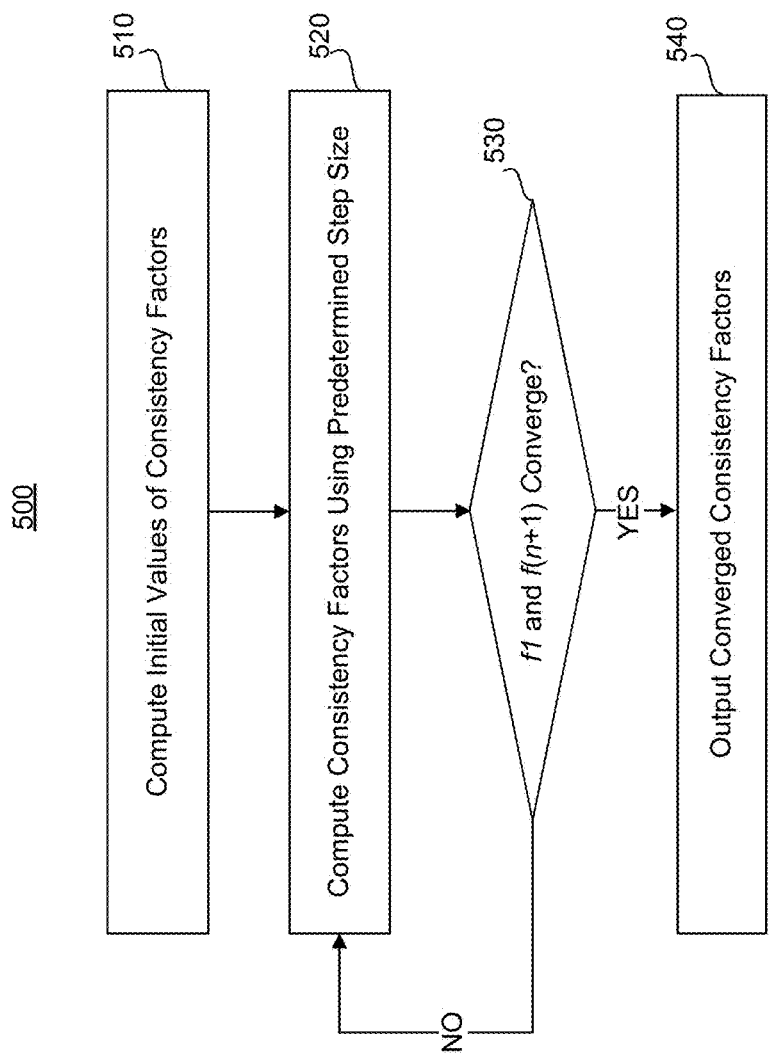
FIG. 5 is a flowchart of a method for determining consistency factors, according to an exemplary embodiment.

In exemplary embodiments, any suitable optimization process may be used to determine the consistency factors $f_i$ (step 340). FIG. 5 is a flowchart of a method 500 for determining the consistency factors, according to an exemplary embodiment. Referring to FIG. 5, method 500 may include the following steps.

In step 510, controller 130 computes initial values of consistency factors.

In performing method 500, controller 130 may use the first source image as a reference image. In one embodiment, controller 130 may assign a predetermined value to $f_1$. For example, controller 130 may set:

$$f_1 = 1 \qquad \text{Eq. 9}$$

Controller 130 may then compute the initial values of the other consistency factors according to:

$$f_{(i+1)} = \frac{\overline{Y}_{ib}}{\overline{Y}_{(i+1)a}} f_i \qquad \text{Eq. 10}$$

Referring back to Eq. 4, $f_{(n+1)}$ is actually the consistency factor associated with the first source image. Therefore, if the computation results of Eq. 10 includes $f_{(n+1)}=1=f_1$, controller 130 may determine that the initially computed consistency factors, when applied to the respective source images, can ensure the luminance consistency across the panoramic image. In such case, method 500 ends.

However, if $f_{(n+1)} \neq f_1$, a direction parameter S may be used to assess the desired direction of adjusting the luminance inconsistency across the ordered source images. Specifically, if $f_{(n+1)}>1$, controller 130 may set S=−1, indicating that the luminance level should be further tuned down in the direction from the first source image to the nth source image. If $f_{(n+1)}<1$, controller 130 may set S=1, indicating that the luminance level should be further tuned up in the direction from the first source image to the nth source image.

If $f_{(n+1)} \neq f_1$, controller 130 proceeds to step 520, in which consistency factors are computed using a predetermined step size. Controller 130 may compute the consistency factors according to:

$$f_{(i+1)} = \frac{f_i \overline{Y}_{ib} + kS}{\overline{Y}_{(i+1)a}} \qquad \text{Eq. 11}$$

where k is an iteration parameter, used to quantify the step size of Eq. 11. If the value of the step size is denoted as p, controller 130 may let k=p. For example, p may be initially set as 0.5. Using Eqs. 9 and 11, controller 130 may compute the entire set of consistency factors $f_i$.

In step 530, controller 130 determines whether $f_1$ and $f_{(n+1)}$ converge. If $f_1$ and $f_{(n+1)}$ converge, controller 130 proceeds to step 540. If $f_1$ and $f_{(n+1)}$ do not converge, controller 130 updates the step size and repeats step 520.

For example, if $|f_{(n+1)}-f_1| \leq 0.01$, controller 130 may determine that $f_1$ and $f_{(n+1)}$ converge, and proceed to step 540. Conversely, if $|f_{(n+1)}-f_1|>0.01$, controller 130 may determine that $f_1$ and $f_{(n+1)}$ do not converge, and return to step 520.

Before each iteration of step 520, controller 130 may update the step size, i.e., the iteration parameter k based on the result of the last iteration. Specifically, if the direction parameter S keeps the same sign after the last iteration of step 520, this indicates that the previously used step size is not large enough. Accordingly, controller 130 may increase the step size according to:

$$k=k+p \qquad \text{Eq. 12}$$

Conversely, if the direction parameter S changes the sign after the last iteration of step 520, this indicates that the previously used step size is too large. Accordingly, controller 130 may first update p according to:

$$p = \frac{p}{2} \qquad \text{Eq. 13}$$

and then decrease the step size according to:

$$k=k-p \qquad \text{Eq. 14}$$

After the iteration parameter is updated, controller 130 may repeat step 520 according to Eqs. 9 and 11, using the updated iteration parameter k and the original direction parameter S. In other words, even if S changes sign after the last iteration of step 520, controller 130 still uses the S obtained from the first iteration of step 520.

In step 540, controller 130 outputs the converged consistency factors.

Application of the converged consistency factors to the respective source images reduces the differences of the mean luminance values at the overlapping regions below the finally reached step size k, and therefore realizes the global optimization of the luminance consistency. For example, the converged consistency factors may be used in method 300 to adjust the luminance level, and similarly the chrominance level, of each source image to reach the global luminance and/or chrominance consistency. This way, the luminance and/or chrominance inconsistency among the source images may be reduced and then evenly spread across the whole panoramic image.

Figure 6A:
FIG. 6A is a 360-degree panoramic image illustrating a result achieved without using the disclosed methods.

FIG. 6A is a 360-degree panoramic image illustrating a result achieved without using the disclosed methods. As shown in FIG. 6A, the panoramic image is only treated with stitching seam smoothing, but without the global adjustment of luminance and/or chrominance. Accordingly, the panoramic image has obvious inconsistency of luminance.

Figure 6B:
FIG. 6B is a 360-degree panoramic image illustrating a result achieved using the disclosed methods.

In contrast, FIG. 6B is a 360-degree panoramic image illustrating a result achieved using the disclosed methods. As shown in FIG. 6B, with the global adjustment of the luminance and/or chrominance, followed by the stitching seam smoothing described in step 350, the resulted panoramic image has consistent visual effect across the entire 360-degree field of view.

While illustrative embodiments have been described herein, the scope of any and all embodiments have equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed processes may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A method for stitching a plurality of images including pixels having pixel values, comprising:
    sorting the plurality of images in an order, such that:
        adjacent images at least partially overlap with each other; and
        the first image and the last image at least partially overlap with each other,
        wherein the plurality of images are generated by one or more imaging devices;
    determining mean pixel values for overlapping region of the images;
    determining consistency factors for the images;
    generating modified mean pixel values by multiplying the mean pixel values by the respective consistency factors;
    adjusting the consistency factors to reduce differences of the modified mean pixel values in the overlapping regions; and
    adjusting the pixel values of the images based on the adjusted consistency factors.

2. The method of claim 1, wherein adjusting the consistency factors comprises:
    constructing an error function of the consistency factors, the error function representing the differences of the modified mean pixel values in the overlapping regions; and
    adjusting the consistency factors to minimize the error function.

3. The method of claim 2, wherein the error function is a sum of squared differences of modified mean pixel values in the overlapping regions.

4. The method of claim 1, wherein determining consistency factors for the images comprises:
    setting the consistency factor associated with a first one of the images to a predetermined value; and
    determining the consistency factors associated with second ones of the images based on the predetermined value and the mean pixel values in the overlapping regions.

5. The method of claim 4, wherein adjusting the consistency factors comprises:
    adjusting the consistency factors such that each difference of the modified mean pixel values is smaller than a threshold.

6. The method of claim 1, wherein adjusting the pixel values of the images based on the respective consistency factors comprises:
    multiplying the pixel values of the images by the respective consistency factors.

7. The method of claim 1, wherein each of the pixel values includes at least one of a chrominance value or a luminescence value.

8. The method of claim 1, further comprising:
    after the pixel values of the images are adjusted, stitching the plurality of images.

9. The method of claim 8, wherein stitching the images comprises:
    smoothing transitions of the pixel values between adjacent ones of the images.

10. The method of claim 1, wherein the plurality of images jointly presents a 360-degree panoramic view.

11. A method for combining multiple images, comprising:
    obtaining n images generated by one or more imaging devices, n being an integer and n≥2;
    identifying first and second regions in the images;
    sorting the images in an order;
    among the n images, pairing the second region of the ith image with the first region of the (i+1)th image, i being an integer and n>i≥1;
    pairing the second region of the nth image with the first region of the first image;
    determining mean pixel values in the first and second regions;
    determining consistency factors for the images;
    generating modified mean pixel values by multiplying the mean pixel values by the respective consistency factors;
    adjusting the consistency factors to reduce differences of the modified mean pixel values in the paired regions; and
    adjusting the pixel values of the images based on the adjusted consistency factors.

12. The method of claim 11, wherein adjusting the consistency factors comprises:
    constructing an error function of the consistency factors, the error function representing the differences of the modified mean pixel values in the paired regions; and
    adjusting the consistency factors to minimize the error function.

13. The method of claim 12, wherein the error function is a sum of squared differences of modified mean pixel values in the paired regions.

14. The method of claim 11, wherein determining the consistency factors for the images comprises:
    setting the consistency factor associated with a first one of the images to a predetermined value; and
    determining the consistency factors associated with second ones of the images based on the predetermined value and the mean pixel values in the paired regions.

15. The method of claim 14, wherein adjusting the consistency factors comprises:

adjusting the consistency factors such that each difference of the modified mean pixel values is smaller than a threshold.

16. The method of claim 11, wherein adjusting the pixel values of the images based on the respective consistency factors comprises:
multiplying the pixel values of the images by the respective consistency factors.

17. The method of claim 11, further comprising:
after the pixel values of the images are adjusted, combining the plurality of images by merging the paired regions.

18. The method of claim 17, wherein combining the images comprises:
smoothing transitions of the pixel values between merged ones of the images.

19. A device for stitching a plurality of images including pixels having pixel values, comprising:
a memory storing instructions; and
a processor configured to execute the instructions to:
sort the plurality of images in an order, such that:
adjacent images at least partially overlap with each other; and
the first image and the last image at least partially overlap with each other,
wherein the plurality of images are generated by one or more imaging devices;
determine mean pixel values for overlapping region of the images;
determine consistency factors for the images;
generate modified mean pixel values by multiplying the mean pixel values by the respective consistency factors;
adjust the consistency factors to reduce differences of the modified mean pixel values in the overlapping regions; and
adjust the pixel values of the images based on the adjusted consistency factors.

20. A non-transitory computer-readable storage medium storing instructions that, when executed by a processor of a device, cause the device to perform a method for stitching a plurality of images including pixels having pixel values, the method comprising:
sorting the plurality of images in an order, such that:
adjacent images at least partially overlap with each other; and
the first image and the last image at least partially overlap with each other,
wherein the plurality of images are generated by one or more imaging devices;
determining mean pixel values for overlapping region of the images;
determining consistency factors for the images;
generating modified mean pixel values by multiplying the mean pixel values by the respective consistency factors;
adjusting the consistency factors to reduce differences of the modified mean pixel values in the overlapping regions; and
adjusting the pixel values of the images based on the adjusted consistency factors.

* * * * *